United States Patent [19]

Ikeda

[11] Patent Number: 5,650,894
[45] Date of Patent: Jul. 22, 1997

[54] GIMBALLED SPRING ARM HAVING A REINFORCED PLATE FOR USE WITH A MAGNETIC HEAD

[75] Inventor: Masaru Ikeda, Kawasaki, Japan

[73] Assignee: Fujitsu Limited, Kawasaki, Japan

[21] Appl. No.: 348,758

[22] Filed: Dec. 2, 1994

Related U.S. Application Data

[63] Continuation of Ser. No. 67,742, May 26, 1993, abandoned.

[30] Foreign Application Priority Data

Jun. 1, 1992 [JP] Japan .................. 4-139529

[51] Int. Cl.$^6$ ........................................ G11B 5/48
[52] U.S. Cl. ........................................ 360/104
[58] Field of Search ........................ 360/103, 104, 360/105, 106; 369/244, 247, 248

[56] References Cited

U.S. PATENT DOCUMENTS

| | | | |
|---|---|---|---|
| 4,625,249 | 11/1986 | Iwata | 360/104 |
| 4,724,500 | 2/1988 | Dalziel | 360/104 |
| 4,760,478 | 7/1988 | Pal et al. | 360/104 |
| 4,797,763 | 1/1989 | Levy et al. | 360/104 |
| 4,819,094 | 4/1989 | Oberg | 360/104 |
| 4,991,045 | 2/1991 | Oberg | 360/104 |
| 5,019,931 | 5/1991 | Ohwe et al. | 360/104 |
| 5,065,271 | 11/1991 | Matsuura et al. | 360/104 |
| 5,187,625 | 2/1993 | Blaeser et al. | 360/104 |
| 5,198,945 | 3/1993 | Blaeser et al. | 360/104 |
| 5,282,103 | 1/1994 | Hatch et al. | 360/103 |

FOREIGN PATENT DOCUMENTS

| | | | |
|---|---|---|---|
| 57-167162 | 10/1982 | Japan | 360/104 |
| 3-017876 | 1/1991 | Japan | 360/104 |
| 3-019182 | 1/1991 | Japan | 360/104 |

OTHER PUBLICATIONS

Rynders, R.R., et al, IBM Technical Disclosure Bulletin, *Damped Slider Mount*, vol. 11 No. 3, Aug. 1968, p. 248.

*Primary Examiner*—Craig A. Renner
*Attorney, Agent, or Firm*—Greer, Burns & Crain, Ltd.

[57] ABSTRACT

A spring arm for supporting a magnetic head is formed by sticking a thin base plate to a resilience reinforcing plate. The spring arm is structured of a long and narrow base plate formed of stainless steel and a reinforcing plate stuck to the base plate. The base plate has a gimbal formed in its distal end portion. The gimbal is defined by two circular arc slits and joined with the base plate by supporting portions formed between the circular arc slits. The base plate has a sufficiently small thickness to allow the gimbal supported by the supporting portions to make a tilting movement with respect to the base plate. The circular arc slits are formed by etching the base plate.

6 Claims, 3 Drawing Sheets

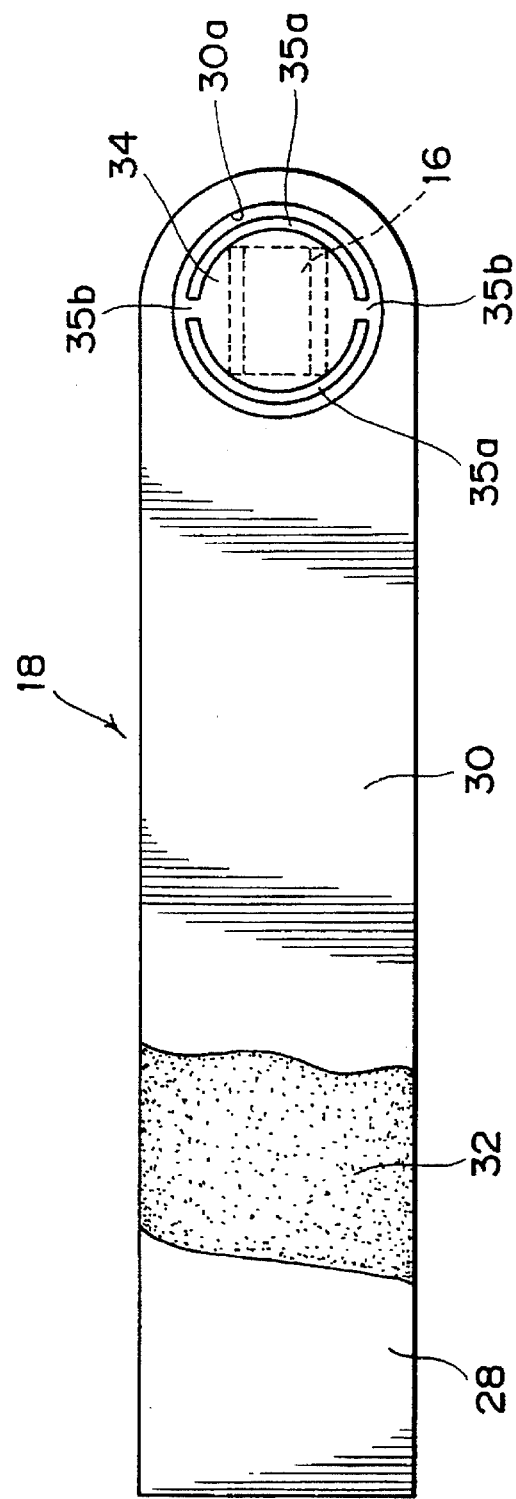
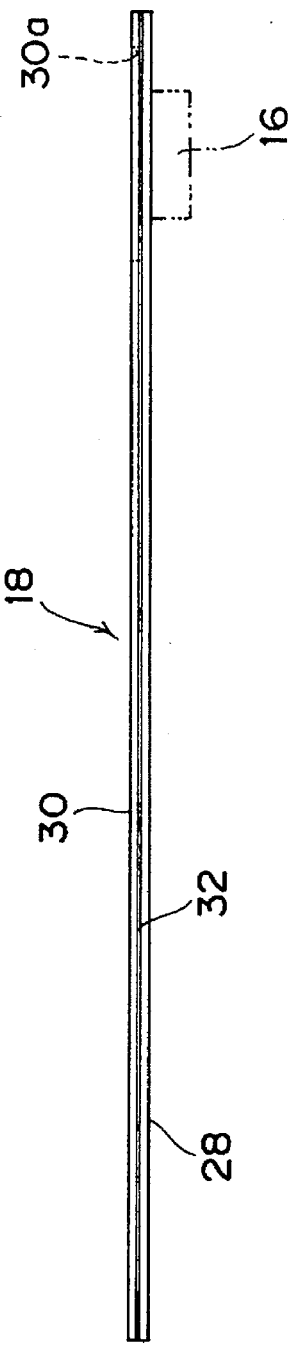

GIMBALLED SPRING ARM HAVING A REINFORCED PLATE FOR USE WITH A MAGNETIC HEAD

RELATED APPLICATION

This is a continuation of application Ser. No. 08/067,742, filed on May 26, 1993, now abandoned.

BACKGROUND OF THE INVENTION

1. Field of the Invention

The present invention relates to a spring arm for supporting a magnetic head in a magnetic disk apparatus.

2. Description of the Related Art

There has recently been an increasing demand for a magnetic disk apparatus of smaller size and with greater storage capacity as one of a computer's external memories. One of the methods to realize greater capacity of a magnetic disk apparatus is to increase the number of magnetic disks put on the spindle. In order to implement this method, the mounting distance between the magnetic disks in the magnetic disk apparatus is becoming smaller of late. Generally, a magnetic disk apparatus includes a rotatively driven spindle, a plurality of magnetic disks put on the spindle, a plurality of magnetic heads for writing data into the magnetic disk and reading data recorded on the magnetic disk, a plurality of spring arms each of which supports a magnetic head, a plurality of head arms each of which is joined at its end with each spring arm and fitted to an actuator shaft for rotation around the same, and an actuator for rotating each head arm around the actuator shaft.

In a magnetic disk apparatus for a computer, a floating magnetic head is frequently used to avoid damage from being caused by the contact between the head and the magnetic disk medium. Through balance of the force for floating the head caused by an air flow generated by the magnetic disk rotating at a high speed (for example, 3600 rpm) and the force of the spring arm pressing the head against the disk, the magnetic head is floated above the magnetic disk with a small gap (approximately 0.15 µm) held therebetween. In such a state the head performs reading/writing of data on the magnetic disk. When the rotation of the magnetic disk is stopped, the magnetic head comes to contact with the magnetic disk urged by the spring force of the spring arm.

The spring arm resiliently supports the magnetic head and is formed of a stainless steel plate with a thickness in the range of 60 µm or so which provides desired resilience. A plan view of a conventional spring arm is shown in FIG. 1. The spring arm 2 is formed of a stainless steel plate approximately 60 µm thick and has at its distal end portion a gimbal 4 for supporting a magnetic head 6. The gimbal 4 is generally shaped with a diameter of approximately 1.6 mm defined by a pair of circular arc slits 5a and is joined with the spring arm 2 at supporting portions 5b formed between the pair of circular arc slits 5a. The circular arc slit 5a is approximately 0.2 mm wide and the supporting portion 5b is also approximately 0.2 mm wide. The magnetic head 6 is stuck to the gimbal 4.

The circular arc slit 5a is formed by chemically etching the spring arm 2. When the plate thickness of the supporting portion 5b is too large, the gimbal 4 cannot be supported sufficiently flexibly and, hence, the tilting movement of the gimbal 4 with respect to the spring arm 2 becomes difficult. Therefore, practice typical only subjects the supporting portions 5b to half etching so that the plate thickness becomes 25 to 30 µm. The half etching is a treatment to obtain a desired etching depth by controlling the etching time. The supporting portion 5b are etched together with the portions for slits 5a and, when the etching depth reaches a desired value for the supporting portions 5b, the supporting portions 5b are masked midway through the only etching, thereafter, etching of the circular arc slits 5a continues.

Thus, the gimbal of the spring arm has conventionally been formed by the techniques of etching and half etching. However, there is a problem with the half etching treatment since the process of half etching is difficult to control and it requires employment of high level techniques. Further, since it is difficult to obtain a uniform etching depth by the half etching treatment, there is also a problem in that the thickness of the supporting portion 5b of the gimbal 4 becomes uneven and, hence, the floating position of the magnetic head above the magnetic disk becomes unstable.

SUMMARY OF THE INVENTION

Accordingly, an object of the present invention is to provide a spring arm for the magnetic head which is easy to fabricate and which is able to stabilize the floating position or attitude of the magnetic head.

In accordance with an aspect of the present invention, there is provided a spring arm for supporting a magnetic head comprising: a long and narrow base plate formed of a resilient material, the base plate having at its distal end portion a gimbal, which is defined by a plurality of circular arc slits and joined with the base plate at supporting portions formed between the circular arc slits, the base plate having a sufficiently small thickness to allow the gimbal supported by the supporting portions to make a tilting movement with respect to the base plate; and a reinforcing plate stuck to the base plate, the reinforcing plate having a larger opening than the gimbal formed in its distal end portion.

Preferably, both the base plate and the reinforcing plate are formed of a stainless steel plate and they are stuck together by a double-coated adhesive tape.

According to the present invention, since the plate thickness of the base plate is small enough to allow the gimbal to make a tilting movement with respect to the base plate, the need for half etching of the supporting portions supporting the gimbal can be eliminated. Resilience of the spring arm can be set to a desired value by the reinforcing plate stuck to the base plate.

The above and other objects, features and advantages of the present invention and the manner of realizing them will become more apparent, and the invention itself will best be understood from a study of the following description and appended claims with reference to the attached drawings.

BRIEF DESCRIPTION OF THE DRAWINGS

FIG. 3 is a schematic plan view of a spring arm according to an embodiment of the invention;

FIG. 4 is a side view of the spring arm shown in FIG. 3; and

DESCRIPTION OF THE PREFERRED EMBODIMENTS

Figure 1:
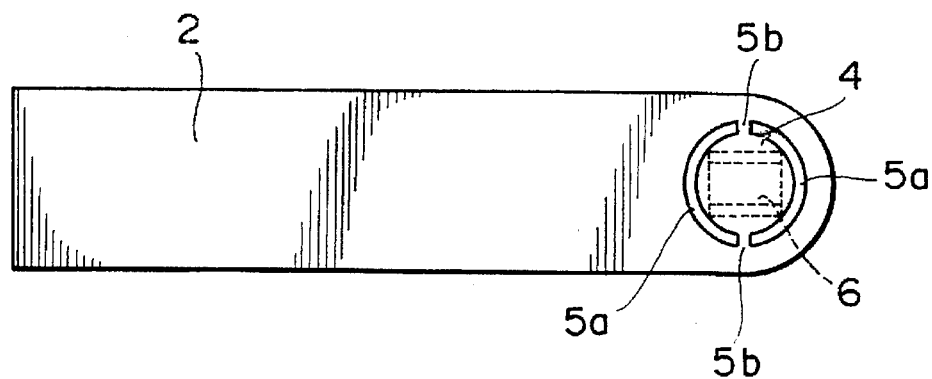
FIG. 1 is a schematic plan view of a conventional spring arm.
Figure 2:
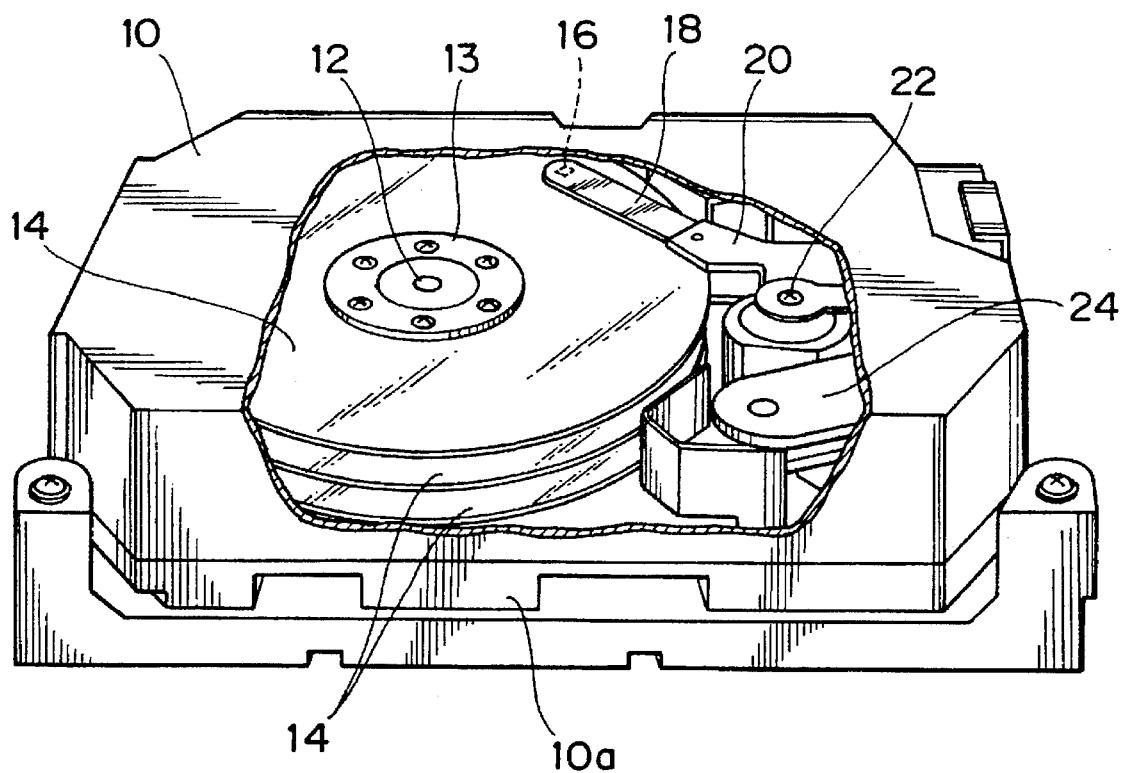
FIG. 2 is a schematic perspective view partly in section of a magnetic disk apparatus with a spring arm of the present invention applied thereto.

Referring to FIG. 2, there is shown a schematic perspective view partly in section of a magnetic disk apparatus including a spring arm according to the present invention. A spindle 12 is rotatably attached to the base 10a of the enclosure 10. The spindle 12 is rotated at a high speed (for example 3600 rpm) by a spindle motor (not shown) set up on the base 10a and coupled with the spindle 12. Magnetic disks 14 and annular spacers, not shown, are alternately inserted in the spindle 12 so that a plurality of magnetic disks 14 are put on the spindle 12 spaced a predetermined distance apart. By fastening a disk clamp 13 to the spindle 12 by screws, each magnetic disk 14 is clamped between the annular spacers and fixed to the spindle 12. Reference numeral 16 denotes a magnetic head attached to the distal end of a spring arm 18 for performing writing/reading of data on the magnetic disk 14. The base end of the spring arm 18 is fixed to a head arm 20, and the head arm 20 is attached to the shaft 22 for rotation around the same. When a voice coil motor 24 is actuated, the head arm 20 is swung around the shaft 22.

When the magnetic disk 14 is rotated at a high speed by the spindle motor (not shown), the magnetic head 16 floats slightly above the magnetic disk 14. The head arm 20 is swung round the shaft 22 by the voice coil motor 24 so that the magnetic head 16 moves to the position over a desired track of the magnetic disk 14 and performs writing/reading of data on the magnetic disk 14.

Figure 5:
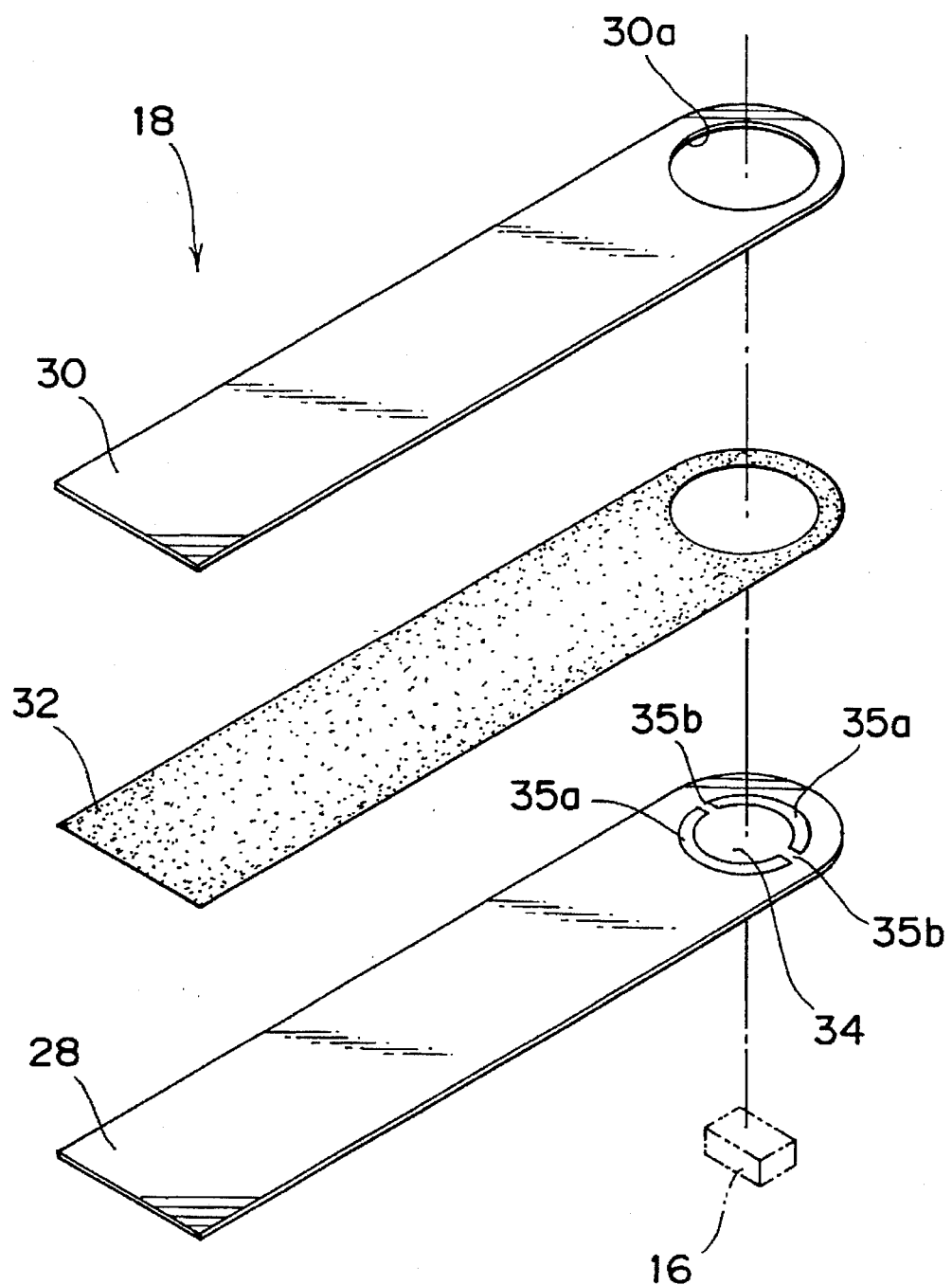
FIG. 5 is an exploded perspective view of the spring arm shown in FIG. 3.

The structure of the spring arm 18 according to an embodiment of the present invention will be described with reference to FIG. 3 to FIG. 5. The spring arm 18 is structured by sticking a long and narrow base plate 28 formed of a stainless steel plate (Japanese Industrial Standards (JIS) SUS304) and a reinforcing plate 30 formed of SUS304 having the same general shape as the base plate 28 together with a double-coated adhesive tape 32. The base plate 28 is approximately 10 to 30 μm thick. The reinforcing plate 30 is approximately 30 μm thick, and one or more sheets of the reinforcing plates 30 are stuck to the base plate 28.

The base plate 28 has at its distal end portion a gimbal 34 being approximately 1.6 mm in diameter defined by a pair of circular arc slits 35a. The gimbal 34 is joined with the base plate 28 at a pair of supporting portions 35b between the pair of the circular arc slits 35a. The circular arc slit 35a is approximately 0.2 mm wide and the supporting portion 35b supporting the gimbal 34 is also approximately 0.2 mm wide. The circular arc slit 35a is formed by chemically etching the base plate 28. Since the plate thickness of the base plate 28 of the present embodiment is approximately 10 to 30 μm, the gimbal 34 is supported by the pair of the supporting portions 35b sufficiently flexibly and, hence, it is allowed to make a tilting movement with respect to the base plate 28. Therefore, the need for hitherto practiced half etching of the supporting portions 35b can be eliminated.

The magnetic head 16 is stuck to the surface of the base plate 28 opposite to the surface on which the reinforcing plate 30 is stuck. The reinforcing plate 30 has at its one end portion a circular opening 30a having a larger diameter than the diameter of the gimbal 34, forming an open area in the reinforcing plate 30, whereby the gimbal 34 is allowed to deform. Since the base plate 28 is formed to be thin enough to allow the gimbal 34 to make a tilting movement, desired resilience cannot be provided by the base plate 28 alone. Accordingly, the spring arm 18 of the present embodiment is adapted to have its resilience set to a desired value in accordance with the thickness of the reinforcing plates 30 and the number of sheets thereof stuck to the base plate 28. In addition, since the double-coated adhesive tape 32 for sticking the base plate 28 and the reinforcing plate 30 together has a damping effect, vibration occurring in the spring arm 18 can be effectively restrained.

According to the present invention, the pair of the supporting portions 35b supporting the gimbal 34 are not subjected to etching and, therefore, accuracy in the plate thickness of the supporting portions 35b is improved. Thereby, the floating position or altitude of the magnetic head 16 can be stabilized. Further, since the need for the half etching to form the supporting portions 35b can be eliminated through use of the present invention, manufacture techniques of the spring arm can be improved.

What is claimed is:

1. A spring arm for supporting a magnetic head comprising:

a long and narrow planar base plate formed of a resilient material, said base plate having at its distal end portion a gimbal, said gimbal being defined by a plurality of slits and joined with said base plate at supporting portions formed between said slits, and said base plate having a sufficiently small thickness to allow said gimbal supported by the supporting portions to make a tilting movement with respect to said base plate; and a reinforcing member consisting essentially of a flat reinforcing plate lying in a single plane and stuck to said base plate by an adhesive material between said base plate and said reinforcing plate, said reinforcing plate having a shape generally matching that of said base plate and a structurally defined open area larger than an area of said base plate including said gimbal, said slits and said supporting portions, said open area being formed in a distal end portion of said reinforcing plate, and said open area being aligned over said gimbal; said reinforcing plate providing added support to said base plate without substantially departing from the planarity of the spring arm.

2. A spring arm according to claim 1, wherein said base plate and said reinforcing plate are formed of a stainless steel plate.

3. A spring arm according to claim 2, wherein said adhesive material comprises a double-coated adhesive tape.

4. A spring arm according to claim 3, wherein said base plate has a thickness of approximately 10 to 30 μm.

5. A spring arm according to claim 2, wherein said slits are shaped in a circular arc and are formed by etching said base plate.

6. A spring arm for supporting a magnetic head comprising:

a long and narrow base plate formed of a resilient material, said base plate having at its distal end portion a gimbal unitarily formed therewith, said gimbal being defined by a plurality of slits and joined with said base plate at supporting portions formed between said slits, and said base plate having a sufficiently small thickness to allow said gimbal supported by the supporting portions to make a tilting movement with respect to said base plate; and a reinforcing member consisting essentially of a planar reinforcing plate lying in a single plane and stuck to said base plate by an adhesive material between said base plate and said reinforcing plate, said reinforcing plate having an outer shape substantially matching that of said base plate and a structurally defined open area larger than an area of said base plate including said gimbal, said slits and said supporting portions, said open area being formed in a distal end portion of said reinforcing plate, and said open area being aligned over said gimbal; said reinforcing plate providing added support to said base plate without substantially departing from the planarity of the spring arm.

* * * * *